United States Patent [19]

Matsubara et al.

[11] Patent Number: 5,345,258
[45] Date of Patent: Sep. 6, 1994

[54] A VIDEOPHONE HAVING AN AUTOMATIC ANSWERING CAPABILITY

[75] Inventors: Atsushi Matsubara, Ogaki; Yoshinori Saito, Konan; Seiji Kato; Yoshinobu Yamakita, both of Hashima, all of Japan

[73] Assignee: Sanyo Electric Co., Inc., Osaka, Japan

[21] Appl. No.: 57,261

[22] Filed: May 4, 1993

[30] Foreign Application Priority Data

May 8, 1992 [JP] Japan .................................. 4-116072
Mar. 10, 1993 [JP] Japan .................................. 5-49335

[51] Int. Cl.$^5$ ........................ H04M 11/00; H04N 7/12
[52] U.S. Cl. ...................................... 348/14; 379/102
[58] Field of Search ........................ 379/53, 54, 90, 93, 379/96-99, 102, 104, 105; 358/85; 348/14-17; H04N 7/12, 7/14

[56] References Cited

U.S. PATENT DOCUMENTS 4,979,028 12/1990 Minematsu et al. .................. 379/53
5,136,628 8/1992 Araki et al. ............................ 379/53

FOREIGN PATENT DOCUMENTS 1-05276   1/1989  Japan ..................................... 379/53
1-137765  5/1989  Japan ..................................... 379/53
2119491   5/1990  Japan .
2-260860 10/1990  Japan ..................................... 379/53
3-196759  8/1991  Japan ..................................... 379/53
3-229587 10/1991  Japan .
 445681   2/1992  Japan .
2223911   4/1990  United Kingdom ................... 379/53

OTHER PUBLICATIONS

"International Standards of Video Conference System", *Communication Technology*, Dec. 1990, pp. 35-42.
"Draft Revision of Recommendation H.261", *International Telegraph and Telephone Consultive Committer (CCTTT)*, Aug. 21, 1990, pp. 1-25.
"User-User Information Transferring Procedure Excerpt from Technical Reference Materials, Interface of INSNET Service", *Nippon Telephone and Telegraph Co., Ltd.*, Apr. 4, 1988, pp. 449-451.

*Primary Examiner*—Wing F. Chan
*Attorney, Agent, or Firm*—Peter L. Michaelson

[57] ABSTRACT

A videophone at e.g., a called location, receives sound signals, video signals and control signals through a communication circuit from a communication line and originating at, e.g., a calling videophone. A start signal detecting means, within the called videophone detects a storage start requesting signal from received control signals originating at a calling videophone. At the time of such detection, a coding circuit within the called videophone again encodes the video signals, that are received by the communication circuit and continuously decoded by a decoding circuit, and transmitted by the calling videophone but only by one frame therefrom and stores the frame into a storage circuit. After storing the one frame, a change-over circuit in the called videophone switches to the storage circuit to continuously store the subsequent incoming coded video and sound signals for eventual playback.

10 Claims, 8 Drawing Sheets

Transmitting Side

FIG.1

Transmitting Side

FIG. 2

Receiving Side

A VIDEOPHONE HAVING AN AUTOMATIC ANSWERING CAPABILITY

BACKGROUND OF THE INVENTION

1. Field of the Invention

This invention relates to a videophone that is capable of storing video signals and sound signals.

2. Description of the Related Art

In recent years, a technique of compressing information content has been largely advanced and a high-speed digital line has been becoming popular. This facilitates development of videophones that intercommunicate sound signals and video signals (dynamic image) at the same time. For example, such a videophone is shown in pages 35 to 42 of "International Standards of Video Conference System", that is described in the December issue of 1990 of "Communication Technology" published by Rick Telocom Co. Ltd. The videophone makes it possible to talk while seeing an image of a party.

However, the above device does not to automatically store video signals from one party in response to call signals of a telephone, when the other party is out, for example. Therefore, it is impossible with this device to confirm pictures after coming home, in case a call occurs while a called party is absent.

Then, there has been proposed a device that automatically stores the video signals of the transmitting party together with the sound signals or a storage start time, in response to the call signals at the time of absense (refer to Japanese Laid Open Patent Publication No. 2-119491).

However, with respect to automatically answering a phone call when the party is not at home, the above conventional device starts storing video signals and sound signals simultaneously with ending of transmission of a voice message that informs a caller of the absence of a called party. As such, a transmitting side (calling party) cannot start storing pictures and speeches at his or her intention, i.e. whenever desired.

This is because there is no system for sending a request to start storing from the transmitting side videophone to the receiving side (called side) videophone. Another reason is that, in case the called side receives the video signals processed by a previous-sample difference coding method which can lessen information amount, it is impossible to decode and play back the signals if the signals are stored halfway. Here, the previous-sample difference coding method is a coding method that encodes one frame of video signals in beginning communication and, thereafter, encodes only the changed part of the image, i.e. only the differences.

There may be proposed one method in which a receiving side videophone decodes and stores the received video signals, as a technique to solve the latter problem.

SUMMARY OF THE INVENTION

In view of the above, it is an object of the invention to provide a videophone that can start storing at a desired time from a transmitting side in case of answering a phone call during absence of the called party in a receiving side videophone.

It is another object of the invention to provide a videophone that can store video and sound signals using a relatively small amount of storage.

In accordance with one preferred mode of the invention, a videophone is provided in which a communicating means is connected with a communication line to transmit and receive video signals and sound signals of a transmitting side and a receiving side. A storage start commanding means commands a storage start of the video signals. A video signal processing means continuously decodes the video signals received through the communicating means. A storing means stores one frame of video signals encoded by the video signal processing means at first, and the video signals received through the communicating means thereafter, when there is a command to start storing from the storage start commanding means.

In accordance with another preferred mode of the invention, there is provided a videophone in which a communicating means is connected with a communication line to transmit and receive video signals and sound signals of a transmitting side and a receiving side. A storage start commanding means commands a storage start of the video signals. A video signal processing means continuously decodes the video signals received through the communicating means until a storage start command from the storage start commanding means occurs, and again encodes the decoded video signals by one frame at the time of the command. A storing means stores one frame of video signals encoded by the video signal processing means at first, and the video signals received through the communicating means thereafter, when there is a command the storage start from to storing commanding means.

In accordance with still another preferred mode of the invention, there is provided a videophone in which a communicating means is connected with a communication line to transmit and receive video signals and sound signals of a transmitting side and a receiving side. A video signal processing means continuously decodes the video signals received through the communicating means. A start signal detecting means detects a control signal representing a storage start request from control signals received through the communicating means in order to command the storage to start.

Further objects and advantages of the invention will be apparent from the following description, reference being had to the accompanying drawings, wherein preferred embodiments of the invention are clearly shown.

DETAILED DESCRIPTION OF THE PREFERRED EMBODIMENTS

Referring to FIGS. 1 to 5, wherein like reference characters designate like or corresponding parts throughout the several views, a first preferred mode of the invention, which is embodied in a videophone, will be described hereafter.

Figure 1:
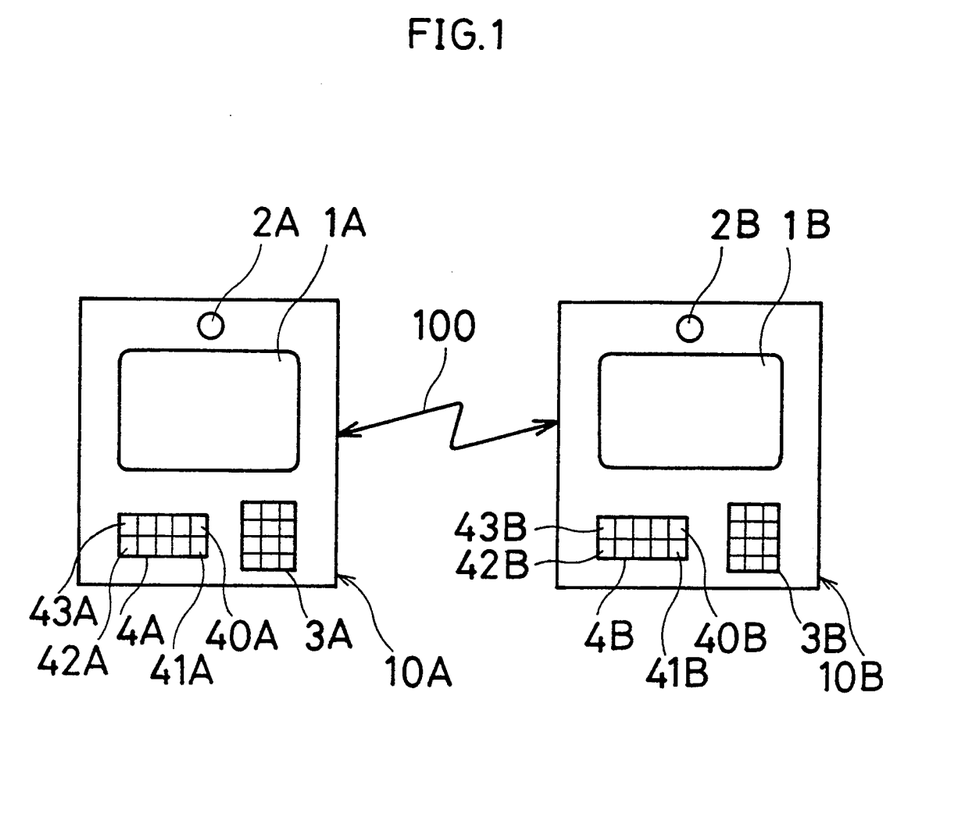
FIG. 1 is a schematic view showing a whole structure of a first embodiment of a videophone of the invention.

FIG. 1 illustrates schematically an entire structure of the videophone of the present embodiment.

In the figure, videophones 10A and 10B, respectively used as a transmitting side and a receiving side, are connected to each other via a communication line 100.

The videophone 10A, 10B has a CRT display 1A, 1B for generating images (pictures), a camera 2A, 2B for capturing images, a ten key 3A, 3B inputting keypad 3A, 3B for entering a phone number of a called subscriber, and mode keys 4A, 4B for selecting and setting various modes. The mode keys 4A, 4B are composed of a message phone key 40A, 40B, a storage start request key 41A, 41B, a transmission ending key 42A, 42B, a playback key 43A, 43B, etc. The message phone key 40A, 40B sets the videophone 10A, 10B in a message phone mode to record images and speeches while the called subscriber is not at home. The storage start request key 41A, 41B directs a timing for recording, at a receiving side, image emanating from a transmitting side. The transmission ending key 42A, 42B causes the videophone to terminate transmission of sound signals and video signals. The playback key 43A, 43B causes the videophone to play back the speeches and pictures recorded in the message phone mode or the like.

Figure 2:
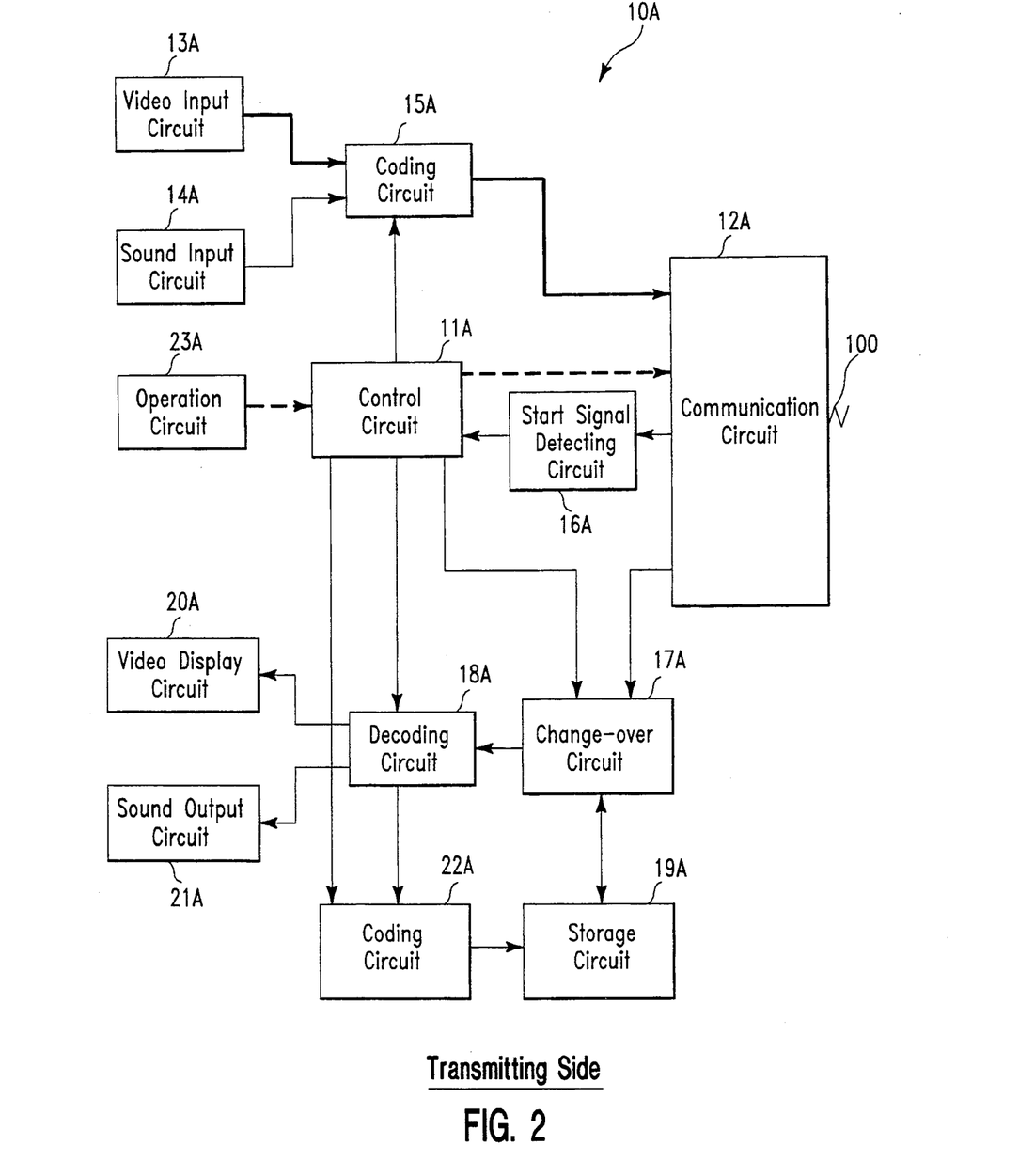
FIG. 2 is a block diagram for explaining an operation of a transmitting side videophone in a first embodiment of the invention.
Figure 3:
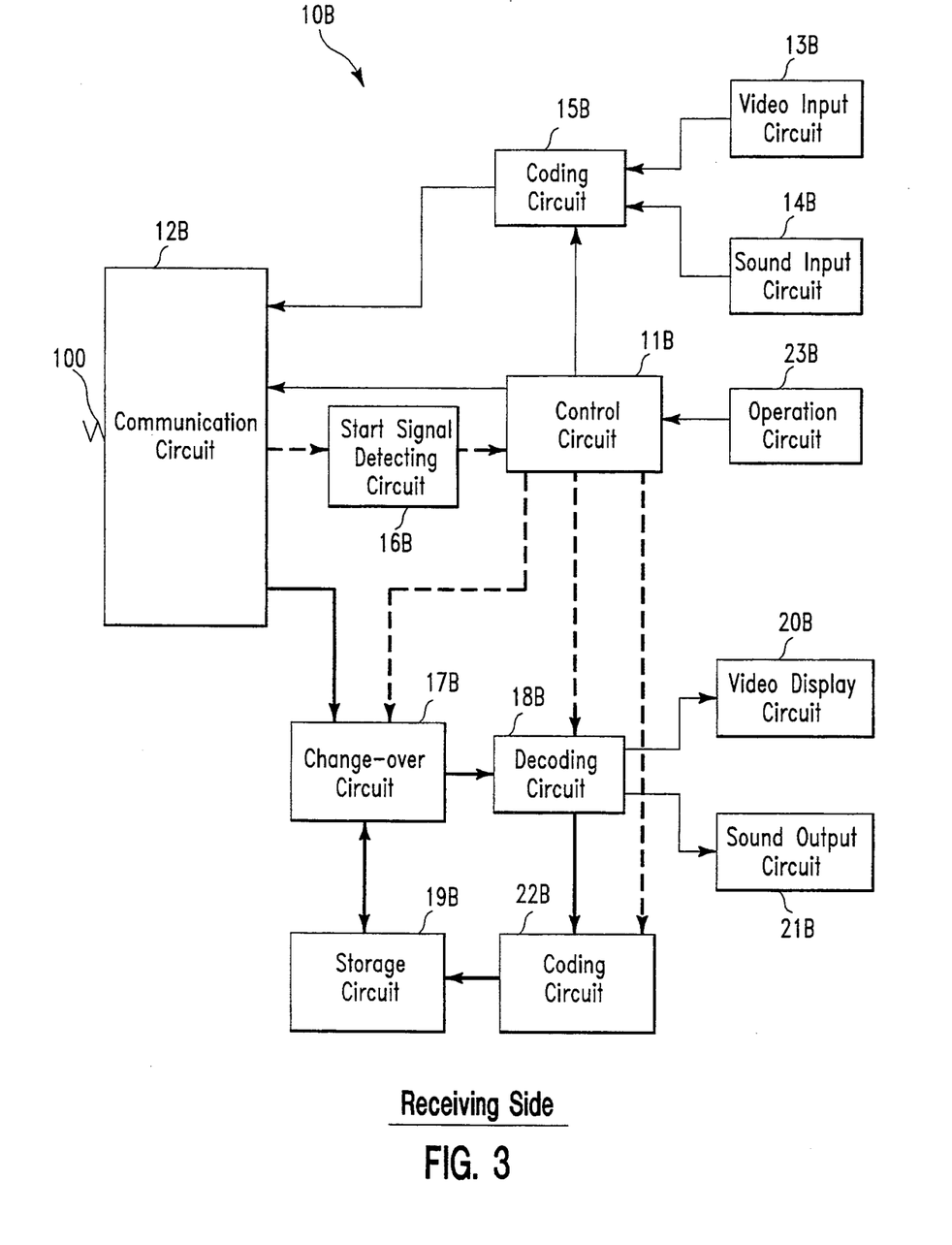
FIG. 3 is a block diagram for explaining an operation of a receiving side videophone in a first embodiment of the invention.

FIG. 2 diagrammatically illustrates the transmission side videophone of the present embodiment wherein thick solid lines show a flow of the video signals and thick dotted lines show a flow of a storage start signal. FIG. 3 diagrammatically illustrates the receiving side videophone of the present embodiment wherein thick solid lines show a flow of the video signals and thick dotted lines show a flow of the storage start signal. Since, the block diagrams of FIGS. 2 and 3 incorporate identical functionality redundant description will be omitted. As a matter of course, the transmission side alternately works as the receiving side while the receiving side acts as the transmission side.

In the FIGS. 2 and 3, the videophone 10A, 10B has a control circuit 11A, 11B connected respectively with functional elements to carry out general control. The videophone 10A, 10B is connected to the communication line 100 via a communication circuit 12A, 12B as a communication means.

The videophone 10A, 10B further has a video input circuit 13A, 13B inputting the video signals from the camera 2A, 2B (see FIG. 1), and a sound input circuit 14A, 14B, as shown in FIGS. 2 and 3, inputting the sound signals. The video signals and the sound signals from the circuits 13A, 13B and 14A, 14B are inputted into a coding circuit 15A, 15B, respectively, to be encoded. At the transmission side, the video signals and the sound signals encoded in the circuit 15A, 15B are sent out to the communication line 100 by the communication circuit 12A, 12B so as to be transmitted to the CRT display 1A, 1B of the videophone 10A, 10B of a called party.

At the receiving side, the signals of the videophone 10A, 10B of the calling party are inputted into a start signal detecting circuit 16A, 16B as a storage start directing means through the communication circuit 12A, 12B from the communication line 100. Then, the start signal detecting circuit 16A, 16B detects a storage start requesting signal among the received signals and inputs it into the control circuit 11A, 11B.

A change-over circuit 17A, 17B receives the coded video and sound signals through the communication circuit 12A, 12B from the communication line 100. The change-over circuit 17A, 17B switches a connection of the communication circuit 12A, 12B selectively to a decoding circuit 18A, 18B or a storage circuit 19A, 19B by control of the control circuit 11A, 11B, thereby inputting the coded signals into any one of the decoding circuit 18A, 18B and the storage circuit 19A, 19B.

The decoding circuit 18A, 18B, as a video signal processing means, decodes the received coded signals, which are supplied from the change-over circuit 17A, 17B. The video and sound signals decoded by the circuit 18A, 18B are applied to a video display circuit 20A, 20B and a sound output circuit 21A, 21B and played back thereby.

A coding circuit 22A, 22B, as a video signal processing means, encodes the video signals decoded by the decoding circuit 18A, 18B by control of the control circuit 11A, 11B and inputs them into the storage circuit 19A, 19B. The storage circuit 19A, 19B is arranged inside or outside the apparatus, and constitutes a storage means that stores the video signals encoded by the coding circuit 22A, 22B or the video signals and the sound signals received through the communication circuit 12A, 12B.

An operation circuit 23A, 23B is connected with the control circuit 11A, 11B. The operation circuit 23A, 23B has a variety of operator keys, as shown in FIG. 1: the message phone key 40A, 40B for commanding the videophone 10A, 10B to set itself to assume the videophone 10A, 10B into an automatic answering mode, the storage start request key 41A, 41B for commanding the videophone to start a storage operation, the transmission ending key 42A, 42B for commanding the videophone to terminate a transmission, the playback key 43A, 43B for commanding the videophone to play back the recorded speeches and images, etc.

Figure 4:
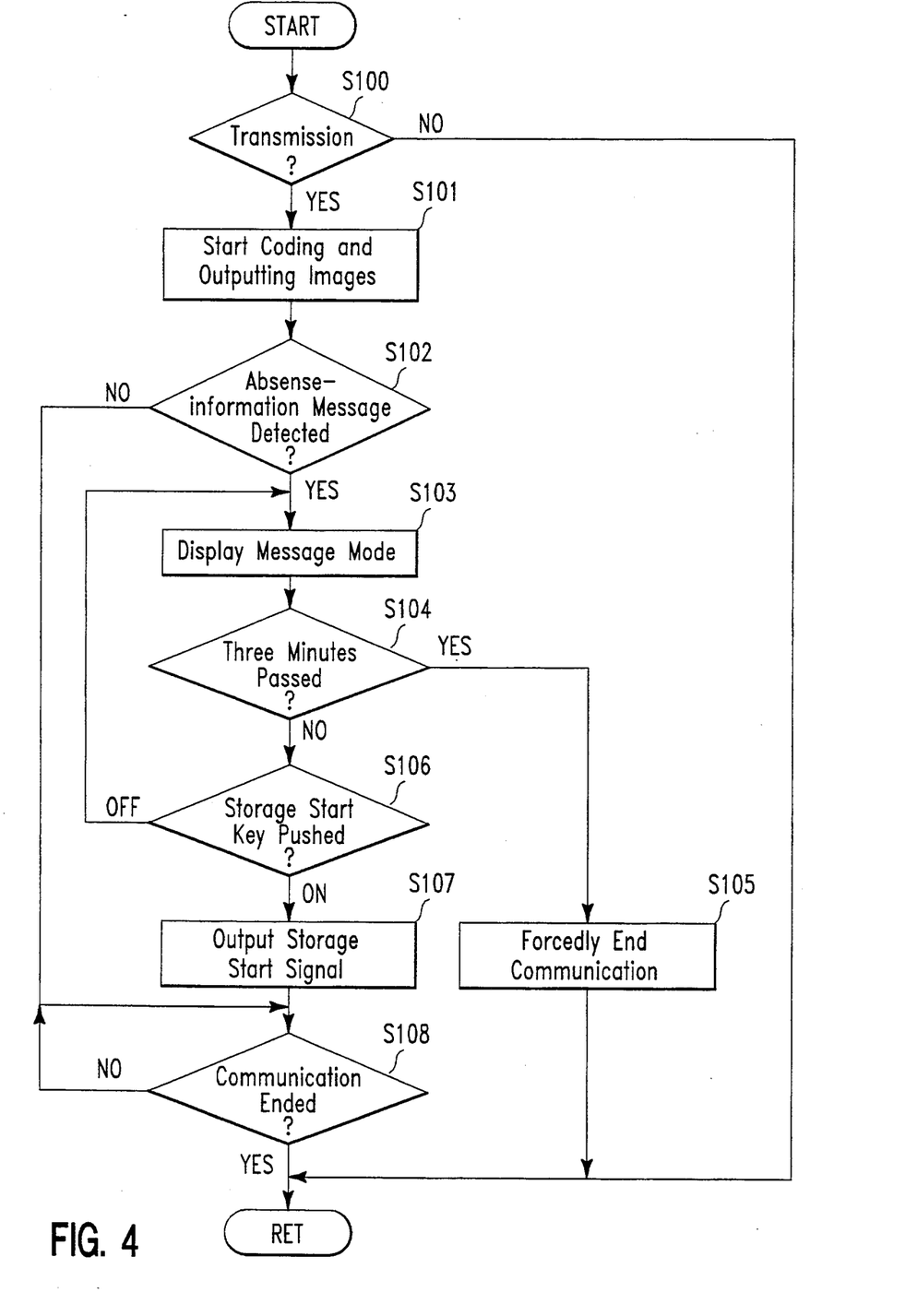
FIG. 4 is a flowchart showing an operation of a transmitting side videophone in a first embodiment of the invention.
Figure 5:
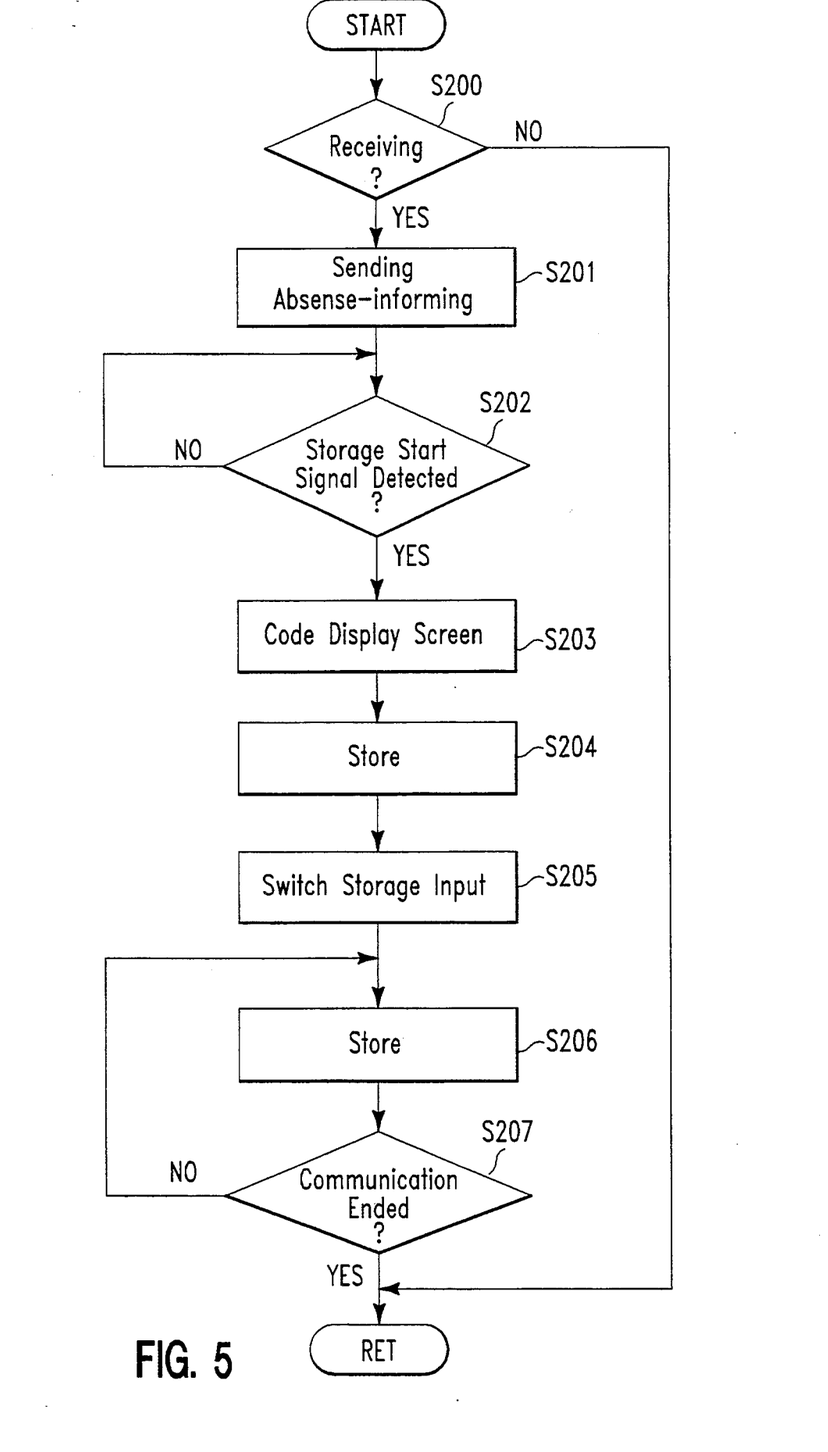
FIG. 5 is a flowchart showing an operation of a receiving side videophone in a first embodiment of the invention.

Referring to FIGS. 4 and 5, a receiving and storing operation of the video signals and the sound signals in an automatic answering mode will be described hereafter in case of communicating between the videophones 10A and 10B of the same structure. The videophone 10A is the transmitting side and the videophone 10B is the receiving side in the following description.

FIG. 4 is a flowchart of the transmitting operation of the present embodiment. FIG. 5 is a flowchart of the receiving operation. These programs are called during executing a main program (not shown). To facilitate understanding, the reader should simultaneously refer to FIGS. 1–5 throughout the following discussion.

When the message phone key 40B arranged in the operation circuit 23B is pushed down, the receiving side control circuit lib enters into an automatic answering mode for automatically answering a phone call. Then, the control circuit 11B starts monitoring a phone call by use of the communication circuit 12B (STEP S200).

On the other hand, when a phone number of the called party is inputted so as to make the one videophone 10A the transmitting side, the transmitting side videophone 10A begins executing the program of FIG. 4 and starts coding and transmitting images to the receiving side (STEP S100 and STEP S101).

Thereafter, when the receiving side control circuit 11B detects the phone call through the communication circuit 12B from the communication line 100, control circuit 11B controls the communication circuit 12B to perform a communication start process like a response and check a connection of the line. Then, the control circuit 11B causes the communication circuit 12B to start receiving the sound signals and the video signals from the calling party and send a message that the called party is absent (voice or picture) and which is stored beforehand in a storing circuit (not shown) (STEP S201).

When the transmitting side videophone 10A receives the message informing the caller that the called party is absent and sent from the receiving side (STEP S102), control circuit 11A causes the CRT display 1A indicate that the receiving side has entered the message phone mode (STEP S103). Moreover, control circuit 11A judges if such a display continues three minutes or more (STEP S104), and, if so, forcedly terminates the communication with the called party (STEP S105), since of communicating costs are being unnecessarily incurred and thus wasted.

The transmitting side videophone 10A judges if the storage start request key 41A is pushed within three minutes, after the videophone received the absence-informing message sent from the receiving side and the CRT display 1A showed the message phone mode of the receiving side (STEP S106). The videophone 10A continues displaying the message for three minutes. During this time, the person of the transmitting side can make his or her appearance neat and prepare material in order to deal with recording for the called party's absence.

When the storage start request key 41A is pushed at the transmitting side, the videophone 10A outputs a storage start signal to the receiving side (STEP S107). Then, control circuit 11A causes the coding circuit 15A to encode the video signals sent from the camera 2A through the video input circuit 13A, to transmits it transmit resulting encoded video signals to the receiving side, and continue in this state until the transmission ending key 42A is pushed (STEP S108).

If the absence-informing message is not received in the STEP S102, the videophone 10A executes the process of the STEP S108. Namely, videophone 10A causes the coding circuit 15A to encode the video signals sent from the camera 2A through the video input circuit 13A, transmit resulting encoded signals to the receiving side, and continue in this state until the transmission ending key 42A is pushed. During this time, the receiving side videophone 10B causes the decoding circuit 18B to decode the video signals and the sound signals received through the communication circuit 12B from the communication line 100, by control of the control circuit 11B. Resulting decoded signals are displayed and outputted by the video display circuit 20B and the sound output circuit 21B.

In the receiving side, the control circuit 11B causes the start signal detecting circuit 16B to begin detecting the storage start signal from the calling party after the transmission of the absence-informing message is completed, and monitors this signal (STEP S202). However, it is unnecessary to wait until the transmission of the absence-informing message is finished in order to start detecting the storage start signal. The detection may be started at a desired timing after the communication line 100 is connected to videophone 10B.

Here, the transmitting side videophone (calling party) 10A sends, through the control circuit 11A which controls the communication circuit 12A, the storage start signal to the receiving side videophone 10B. As a result, the control circuit 11B causes the communication circuit 12B to generate a signal representing the start (e.g. a predetermined coded signal) when the control circuit 11A detects pushing of the storage start request key 41A arranged in the operation circuit 23A.

In the receiving side videophone 10B, if the control circuit 11B receives the storage start signal outputted in the STEP S107 of the receiving side (called party) via the start signal detecting circuit 16B, control circuit 11B causes the decoding circuit 18B to generate decoded images, upon detection of the storage start signal, to the coding circuit 22B and command the coding circuit 22B to encode the images, even though the videophone 10B has been receiving previous-sample difference coded video signals (difference signals of moving picture). The coding circuit 22B encodes the decoded images inputted from the decoding circuit 18B by one frame (STEP S203), and stores the frame within the storage circuit 19B (STEP S204). The control circuit 11B controls the change-over circuit 17B to immediately switch the output of the received signals to the storage circuit 19B (STEP S205). The control circuit 11B introduces and continuously stores the following video and sound signals into the storage circuit 19B directly from the communication circuit 12B (STEP S206).

In the operation from STEP S203 to STEP S206, one frame of coded video signals is stored within the storage circuit 19B when the start signal is detected and, thereafter, the following previous-sample difference coded video signals and the coded sound signals.

When the control circuit 11B detects passage of a predetermined time from the start of the storage operation by a timer circuit (not shown) or a communication ending signal from the calling party via the communication circuit 12B (STEP S207), control circuit 11B stops further coding to by the coding circuit 22B and storing to by the storage circuit 19B. Then, the control circuit 11B executes a communication ending process to return videophone 10B to a waiting state for calling.

A playback of the video and sound signals, stored in the storage circuit 19B by the above procedure, is carried out as follows. When the control circuit 11B detects that the playback key 43B arranged in the operation circuit 23B is depressed, control circuit 11B controls the decoding circuit 18B to read, via the change-over circuit 17B, the signals from the storage circuit 19B and to decode the signals so read, thereby displaying and outputting resulting decoded signals by the video display circuit 20B and the sound output circuit 21B.

A second embodiment of the invention will be described hereafter, referring to FIG. 6 and FIG. 7. The second embodiment discloses the operation of the changeover circuit 17A, 17B, of the first embodiment, in further detail. To simplify understanding, the same or corresponding elements those in the first embodiment are appended with the same reference characters, the description of these elements is omitted. The flowchart showing the operation of the present embodiment is the same as that of FIG. 4 and FIG. 5.

Figure 6:
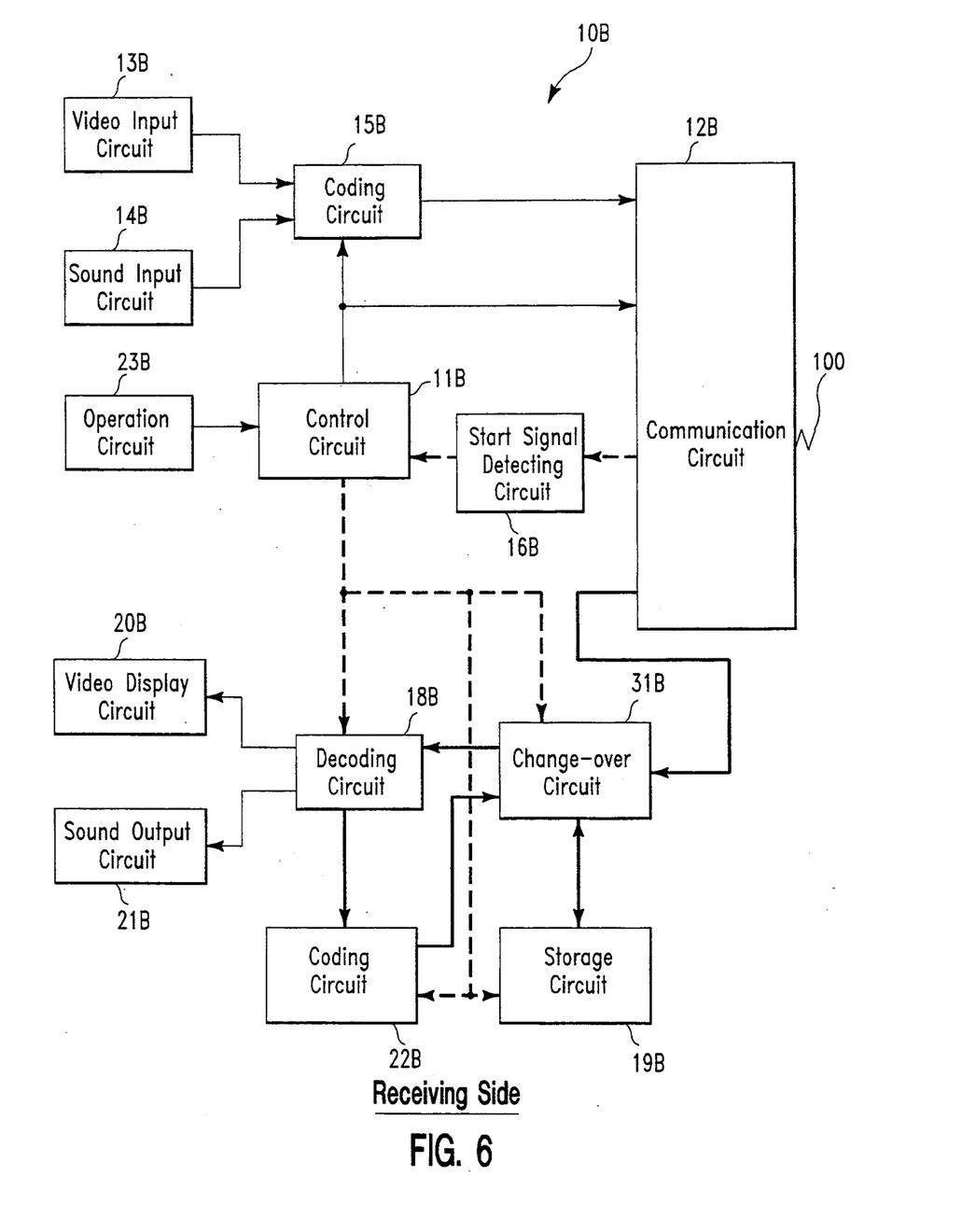
FIG. 6 is a block diagram showing a second embodiment of a videophone of the invention.
Figure 7:
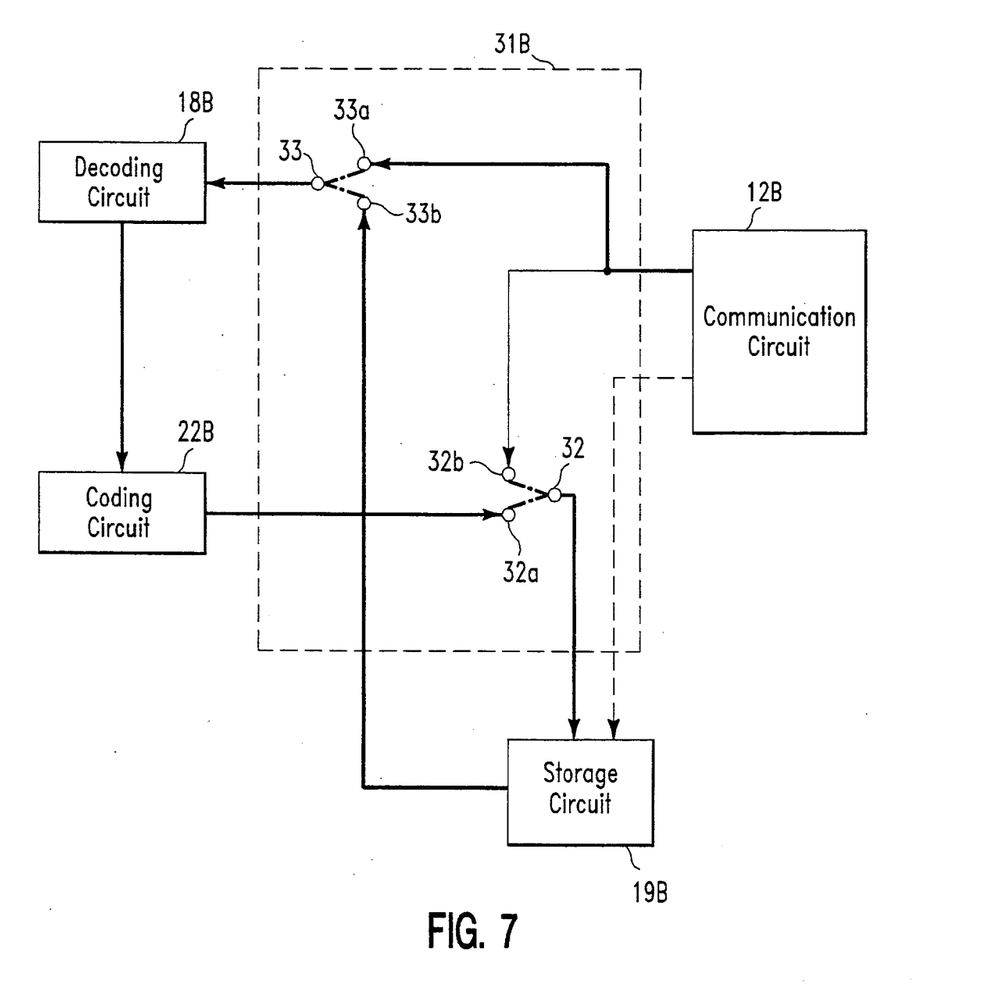
FIG. 7 is a block diagram showing a change-over circuit in detail of a second embodiment of a videophone of the invention.

FIG. 6 diagrammatically illustrates the present embodiment of the videophone. FIG. 7 diagrammatically illustrates a change-over circuit of the present embodiment of the videophone. In these two figures, thick solid lines show a flow of the video signals, while thick dotted lines show a flow of the storage start signal as a control signal. The reader should simultaneously refer to FIGS. 1, 6 and 7 throughout the following discussion. In the figures, while the one videophone 10B is shown as a receiving side for sake of convenience, the other videophone 10A has the same structure and acts in the same manner.

In the figures, a change-over circuit 31B controlled through control circuit 11B, switches to cause the storage circuit 19B to selectively store therein the coded video and sound signals received through the communication circuit 12B from the communication line 100 or the signals coded in the coding circuit 22B.

Specifically, the change-over circuit 31B switches the connection to a contact 32a and a contact 33a, thereby supplying the coded signals from the communication circuit 12B to the decoding circuit 18B through the contact 33a. Then, one frame of the decoded video signals is fed to the coding circuit 22B from the decoding circuit 18B. The signals again coded by the coding circuit 22B are stored into the storage circuit 19B through the contact 32a of the change-over circuit 31B. The change-over circuit 31B changes over to the contact 32b immediately thereafter, and the immediately following coded signals are stored into the storage circuit 19B through the contact 32b directly from the communication circuit 12B.

The change-over circuit 31B, through control exerted by the control circuit 11B, switches to selectively give the decoding circuit 18B the video and sound signals received through the communication circuit 12B from the communication line 100 or the signals read from the storage circuit 19B. The decoding circuit 18B decodes the received signals supplied from the change-over circuit 31B or the coded signals read from the storage circuit 19B, as in the first embodiment.

In addition the change-over circuit 31B switches the connection to a contact 33a at the time of receiving, thereby supplying the coded signals from the communication circuit 12B to the decoding circuit 18B through the contact 33a. The change-over circuit 31B changes over to the contact 33b at the time of playback, thereby supplying the coded signals from the storage circuit 19B to the decoding circuit 18B through the contact 33b.

A receiving and storing operation of the video signals and the sound signals in the automatic answering mode will be described hereafter in case of communicating between the videophones 10A and 10B of the same structure.

When the message phone key 40B arranged in the operation circuit 23B is pushed down, the receiving side control circuit 11B enters into an automatic answering mode similar to STEP S200 of the first embodiment (see FIG. 5), and starts monitoring a phone call by use of the communication circuit 12B.

At this time, the change-over circuit 31B switches to the contact 33a (shown in FIG. 7) so as to apply the video and sound signals, received through the communication circuit 12B from the communication line 100, into the decoding circuit 18B. Moreover, the change-over circuit 31B switches to the contact 32a so as to route the output of the coding circuit 22B to the storage circuit 19B. The above switching operation is controlled by the control signal of the control circuit 11B.

Thereafter, the circuit 11B executes the procedure of STEP S201 to STEP S206 of the first embodiment. Then, the control circuit 11B, as in STEP S207 of the first embodiment, stops encoding by the coding circuit 22B and storing by the storage circuit 19B. Then, the control circuit 11B executes the communication ending procedure and returns to the waiting state for a phone call.

During this time, through control exerted by the control circuit 11B, the change-over circuit 31B is so switched as to route the signals from the coding circuit 22B into the storage circuit 19B.

A playback of the video and sound signals stored in the storage circuit 19B by the above procedure is carried out as follows. When the control circuit 11B detects that the playback key 43B, arranged in the operation circuit 23B, is depressed this control circuit controls the change-over circuit 31B so that the signals read from the storage circuit 19B are applied to the decoding circuit 18B. Then, the control circuit 11B controls the decoding circuit 18B to read and decode the signals from the storage circuit 19B via the change-over circuit 31B, thereby displaying and outputting resulting decoded signals by the video display circuit 20B and the sound output circuit 21B.

As clearly shown in the above description, in case of storing the received video and sound signals at the time of automatic answering in the message phone mode of the videophone 10A, 10B, the present invention enables a transmitting side operator to start storing at his or her desired timing, since the storage, at the receiving side, starts when the storage start signal sent from the transmitting side is detected.

Moreover, a small memory capacity of the storage circuit 19A, 19B is enough in the invention, since, in receiving and storing, only one frame of images is again coded and stored at the time of storage start instruction, and the following received and stored video signals are received in a form of the previous-sample difference coded signals.

Furthermore, in the above embodiments, since the integrated services digital network (ISDN), which is applicable to the communication line 100, has a control line (D channel), it is possible to send and receive the storage start signal utilizing the control line.

Figure 8:
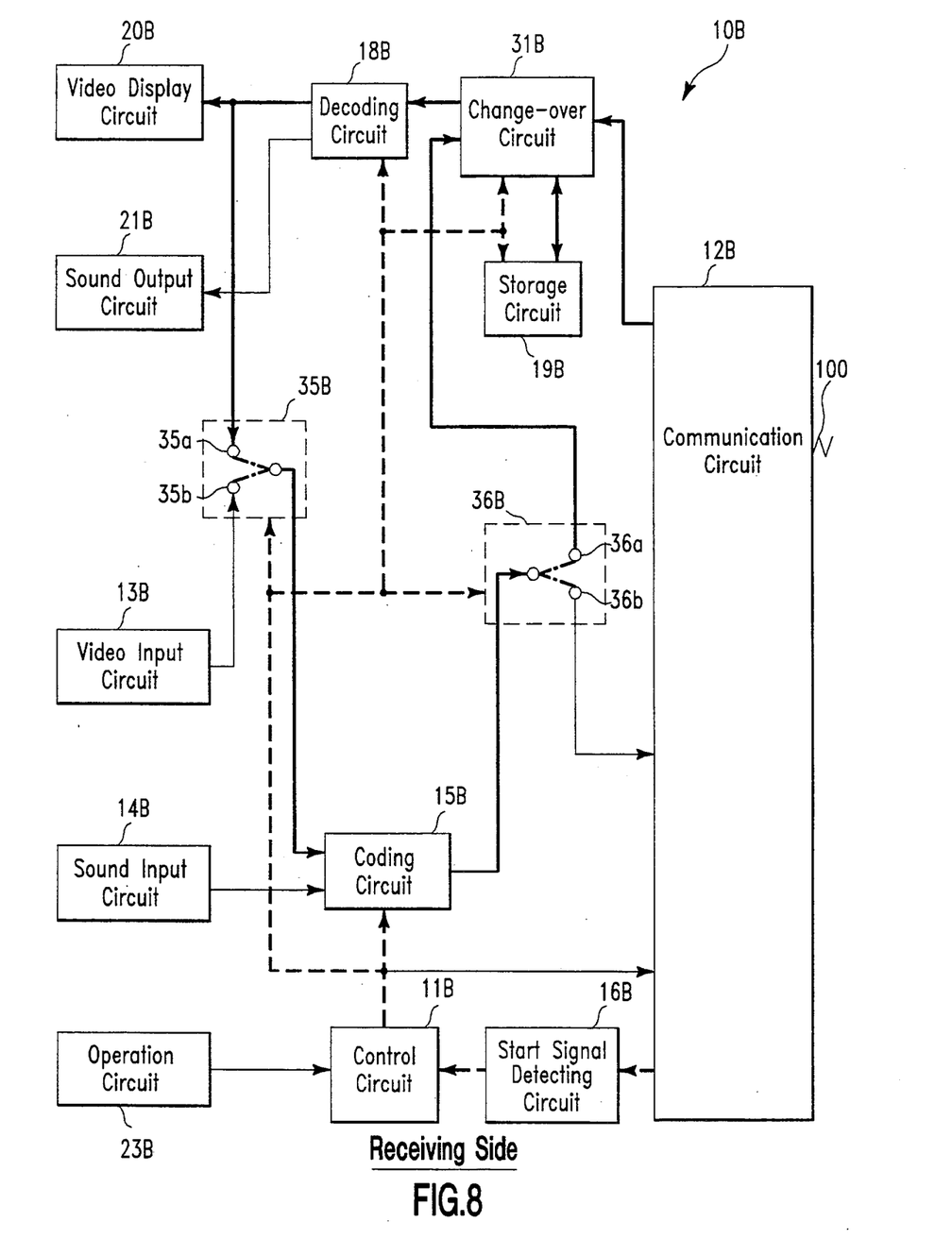
FIG. 8 is a block diagram showing a modification with a unitary coding circuit, of the inventive videophone.

This invention may be practiced or embodied in still other ways without departing from the spirit and essential character thereof. For instance, while the above embodiments are provided with separate coding circuits 15A, 15B, 22A, 22B respectively for transmitting and receiving, the present invention is not limited thereto. As shown in FIG. 8, it is possible to unify the coding circuits into one circuit by adding a switching means that, at a desired timing, switches the signals applied into the coding circuit and the signals produced from the coding circuit, for example.

FIG. 8 schematically illustrates a modification that has a unified coding circuit of the videophone of the invention. In the figures, thick solid lines show a flow of the video signals, while thick dotted lines show a flow of the storage start signal as a control signal. In the figures, though the one videophone 10B is shown as a receiving side for the sake of convenience, the other videophone 10A has the same structure and acts in the same manner.

In this modification, the coding circuit 15B, used for transmission, also serves for receiving. The control circuit 11B controls a first switching means 35B to selectively apply the decoded video signals from the decoding circuit 18B or the video signals from the video input circuit 13B to the coding circuit 15B.

The control circuit 11B also controls a second switching means 36B to supply the coded signals of the coding circuit 15B selectively into the change-over circuit 31B or the communication circuit 12B.

Specifically at the time of transmission, the first switching means 35B changes over to a contact 35b, and the second switching means 36B changes over to a contact 36b. Thus, the video signals of the video input circuit 13B are applied to and coded in the coding circuit 15B through the first switching means 35B. The coded signals are sent from the communication circuit 12B to the communication line 100 via the second switching means 36B.

At the time of receiving, the first switching means 35B changes over to a contact 35a, and the second switching means 36B changes over to a contact 36a. Thus, the decoded video signals of the decoding circuit 18B are routed to and coded in the coding circuit 15B through the first switching means 35B. The resulting coded signals, routed through second switching means 36B, then sent from the change-over circuit 31B to the storage circuit 19B.

While the above embodiments store the video and sound signals from the communication line 100 by the command from the transmitting side, the invention is not limited thereto. For example, in case there is a person at the receiving side, the storage may be started and stopped at a timing defined by depression of the storage start request key 41B arranged in the operation circuit 23B. Alternatively, signals incoming from the video input circuit 20A, 20B or the sound input circuit 21A, 21B of his or her own side may be stored instead of the received signals at a timing defined by depression of the storage start request key 41A, 41B, in the same manner as above.

While the above embodiments control the mixed video and sound signals as communication signals of the transmitting or receiving side, only the sound signals of the video signals may be controlled as the communication signals, for example.

The above embodiments use the change-over circuit 17B, 31B to load the storage circuit 19B with one frame of coded video signals from the circuits 18B and 22B at the time of request for storage start, and, thereafter, the previous-sample difference coded signals from the communication circuit 12B. As such, storage circuit 19B only needs to have a relatively small capacity. Furthermore change-over circuit 17A, 31B may be omitted in the present invention. That is, the invention may alternately be so structured that the signals from the decoding circuit 18B are applied to the coding circuit 22B, the video display circuit 20B and the sound output circuit 21B, and that the signals from the coding circuit 22B are applied to the storage circuit 19B. Hence, the coding circuit 22B continuously codes the output of the decoding circuit 18B, and the storage circuit 19B starts storing at the time of request for storage start. Thus, it is possible to request the storage start at a desired timing from the transmitting side by depressing the storage start request key 41A in while videophone 10B is answering the phone call in absence the absence of the called party.

The preferred embodiments described herein are therefore illustrative and not restrictive, the scope of the invention being indicated in the appended claims and all variations which come within the meaning of the claims are intended to be embraced therein.

What is claimed is:

1. A videophone comprising:
    communicating means, connected to a communication line, for transmitting and receiving difference encoded sound signals and video signals onto or from said line;
    storage start commanding means for generating a storage start command, an occurrence of said storage start command temporally defining when storage of the video signals is to start;
    video signal processing means, connected to said communication means, for continuously decoding, until the command occurs, the video signals and sound signals received through the communicating means in order to form decoded video and sound signals, respectively, and, in response to said command, encoding the decoded video signals to generate one frame of the encoded video signals; and
    storing means, operative in response to an occurrence of said storage start command, for storing the one frame of video signals encoded by the video signal processing means and thereafter storing difference encoded video signals received through the communicating means.

2. The videophone according to claim 1 wherein the storage start commanding means comprises:
    start signal detecting means for detecting, from control signals received through the communication means, a control signal, representing a storage start request, in response to which the storage start command is to be generated.

3. The videophone according to claim 1 wherein the storage start commanding means comprises:
    operating means, operable at a receiving side, for commanding the storage start commanding means to invoke, through said storing means and said video signal processing means, storage start and storage stop operations at a desired timing.

4. The videophone according to claim 1 further comprising:
    change-over means for selectively supplying the encoded video signals, appearing on the communication line and received by the communication means, to either the video signal processing means or the storing means.

5. The videophone according to claim 4 wherein the video signal processing means comprises:
    means for decoding the encoded video signals supplied by the change-over means so as to form decoded video signals and for applying the decoded video signals to a video display means for display thereon until the storage start command occurs; and
    means for coding the decoded video signals produced by the decoding means so as to form second encoded video signals and for applying, in response to the occurrence of the storage start command, the second encoded video signals to the storing means for storage therein.

6. The videophone according to claim 5 wherein the change-over means comprises means for selectively applying either the video signals received by the communicating means or the second encoded video signals into the storing means and for selectively applying either the video signals received by the communication means or video signals read from the storing means into the decoding means.

7. The videophone according to claim 6 wherein the decoding means decodes the video signals supplied from the change-over means while the video signals are being received by the communication means and decodes the video signals reads from the storing means while the encoded video signals stored therein are being played back.

8. The videophone according to claim 7 further comprising:
input means, connected to the coding means, for supplying non-encoded video signals to the coding means at a predetermined time so as to form encoded transmission video signals; and
means for supplying the encoded transmission video signals to the communicating means for transmission over said communication line.

9. A videophone comprising:
means for providing input video signals;
communicating means, connected to a communication line, for transmitting and receiving difference encoded sound signals and video signals onto or from said line;
storage start commanding means for generating a storage start command, an occurrence of said storage start command temporally defining when storage of the video signals is to start;
video signal processing means connected to said communication means and having a decoded and an encoded; wherein the decoder continuously decodes, until the storage start command occurs, the video signals and sound signals received by the communicating means in order to form decoded video and sound signals, respectively; and wherein the encoder encodes the input video signals prior to an occurrence of the storage start command, and, in response to the occurrence of said command, encodes the decoded video signals to provide one frame of coded video signals; and
storing means, operative in response to the occurrence of said storage start command, for storing the one frame of video signals encoded by the video signal processing means and thereafter storing difference encoded video signals received through the communicating means.

10. A videophone comprising:
communicating means, connected to a communication line, for transmitting and receiving difference encoded sound signals and video signals onto or from said line;
video signal processing means, connected to said communication means, for continuously decoding the video signals and sound signals received through the communicating means in order to form decoded video and sound signals, respectively; and
storage start detecting means, connected to said communicating means, for detecting, from control signals received through the communication means, a control signal, representing a storage start request, in response to which storage of the video and audio signals is to start.

* * * * *